Sept. 11, 1962
L. H. COOK ETAL
3,053,891
PROCESS FOR PRODUCTION OF UREA
Filed May 5, 1959
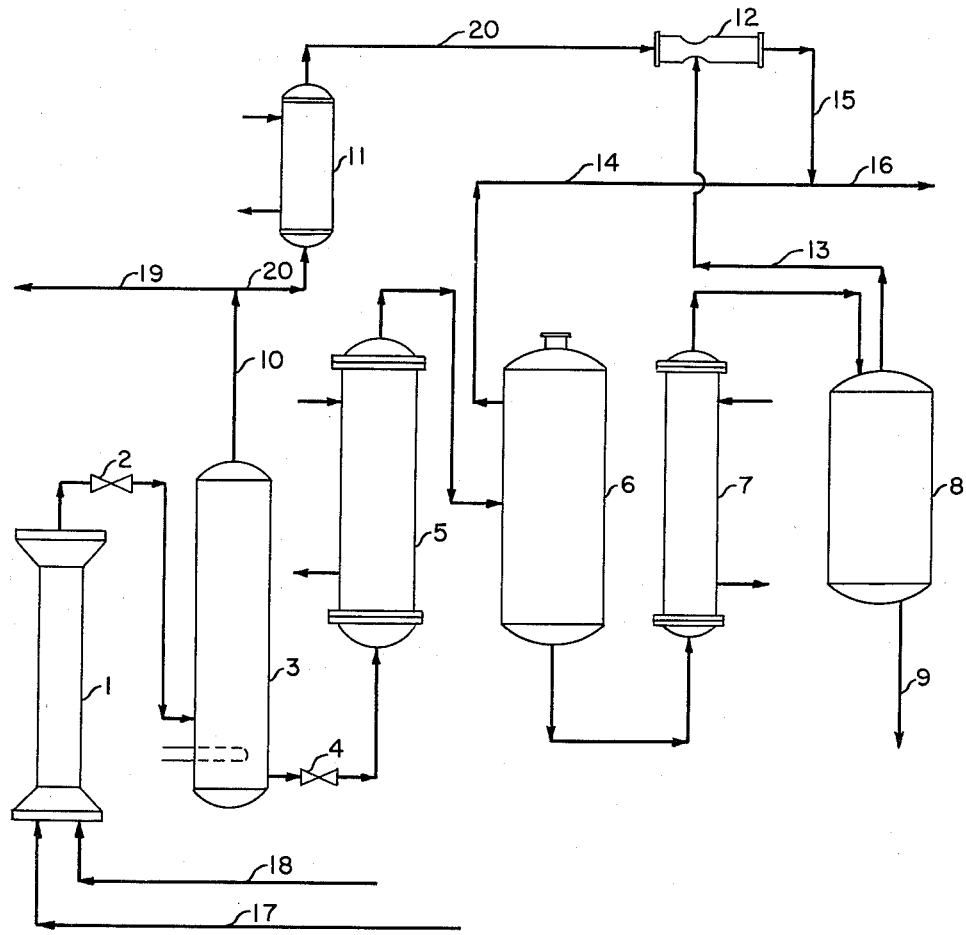
L. H. COOK
J. COLONIAS
INVENTORS
BY J. W. McCloskey
AGENT 3,053,891
PROCESS FOR PRODUCTION OF UREA
Lucien H. Cook, Port Washington, N.Y., and John Colonias, Elizabeth, N.J., assignors to Chemical Construction Corporation, New York, N.Y., a corporation of Delaware
Filed May 5, 1959, Ser. No. 811,128
5 Claims. (Cl. 260—555)

This invention relates to improvements in the manufacture of urea from ammonia and carbon dioxide. More specifically the invention concerns the treatment of the effluent from the synthesis reaction vessel, and improvements in the processing of this effluent before its urea content is separated and delivered to subsequent operations; such as, prilling or crystallization.

The manufacture of urea involves the reaction of ammonia with carbon dioxide in a high-pressure vessel at elevated temperature. The effluents from the reaction vessel consist of urea, unreacted material, water and the intermediate compound, ammonium carbamate. The reaction proceeds according to the following reactions:

(1) 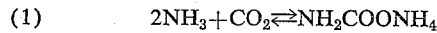
$$2NH_3 + CO_2 \rightleftharpoons NH_2COONH_4$$

(2) 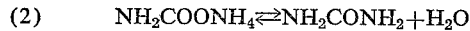
$$NH_2COONH_4 \rightleftharpoons NH_2CONH_2 + H_2O$$

Equation 1 shows the formation of the intermediate compound ammonium carbamate. Reaction 2 shows the dehydration of ammonium carbamate to yield urea and water.

It is common practice to employ an excess of ammonia above the stoichiometric requirements. This invention is preferably concerned with, but not restricted to, a condition where a 200% excess of said ammonia over the stoichiometric requirements is employed.

One of the principal problems encountered in urea manufacture is that under process conditions in commercial usage, Reaction 2 does not go to completion. Thus an important portion of the reaction vessel effluent consists of ammonium carbamate. Various processes and methods have been developed for the removal of this ammonium carbamate from the effluent stream, such as dissolving it in a solvent or solvents and recycling to the reaction vessel, or decomposing to yield ammonia and carbon dioxide in accordance with Equation 1. The present invention is particularly concerned with the method of treating the synthesis reactor effluent, in which the decomposition of ammonium carbamate is accomplished in a two-stage process. A rapid final decomposition of ammonium carbamate is obtained by maintaining a reduced pressure during the second stage decomposition-separation. The reduced pressure is obtained by a novel utilization of the excess ammonia off-gas, which yields a product urea of lower ammonia content, while recovering the final portions of ammonia from the urea solution in a more usable form.

The invention provides a process in which the excess ammonia off-gas, obtained at relatively high pressure, is passed through a suction generating device such as an ejector. The suction effect is applied to the impure urea solution and thereby removes any ammonia present while avoiding the removal of an excessive quantity of water with the ammonia. Thus a significant process improvement has been produced, since in the prior art, final ammonia removal and recovery is accomplished by evaporation plus condensation. This results in the production of a large quantity of dilute aqueous ammonia solution, which is difficult to utilize further in plant operations.

In some plants the residual ammonia is merely driven off by applying heat to the urea solution before prilling or crystallization. This may result in considerable ammonia loss unless precise process control is attained at all times. In addition, the formation of biuret is favored by heating the solution. The present invention provides process operating flexibility since excessive loss of ammonia cannot occur regardless of operating variations or upsets, and execessive heating of the urea solution in removing residual ammonia therefrom is avoided.

It is an object of the present invention to provide an improved method of processing effluent from the urea synthesis reaction vessel.

Another object of this invention is to produce urea with a minimum loss of valuable ammonia.

A further object of this invention is to utilize in a more efficient manner the excess ammonia off-gas which is recovered in a by-product stream when excess ammonia above the stoichiometric requirements is employed in the urea synthesis reaction vessed.

Another object of this invention is to effect the removal of ammonia from the effluent stream from a urea synthesis reaction vessel, employing an improved ammonium carbamate decomposition process which may utilize absolute pressures below atmospheric in the second stage.

An additional object of this invention is to recover residual ammonia from the urea solution product in a more usable form.

Still another object of this invention is to produce a relatively complete removal of residual ammonia from the urea solution product.

Other objects of this invention will become evident from the description which follows.

Referring to the FIGURE, ammonia feed stream 17 and carbon dioxide feed stream 18 are passed into the urea synthesis reaction vessel 1, in which generally the reaction conditions of approximately 4200 p.s.i.a. and 365° F. are maintained. The effluent stream from reaction vessel 1 passes through pressure reducing unit 2, the effluent stream then enters excess ammonia separator 3 at a pressure below 275 p.s.i.a. and temperature above 200° F. The operation of unit 3 is essentially as described in the pending application No. 344,521, filed March 25, 1953, now U.S. Patent No. 2,894,878. The primary function of this unit is to remove a major portion of the excess ammonia present in the effluent stream as a high purity gas at 215 to 265 p.s.i.a. via line 10.

The residual effluent leaves unit 3, passes through pressure reducing unit 4 and enters first stage ammonium carbamate decomposer 5 at a pressure of 20–75 p.s.i.a. and temperature of 200–260° F. The operation of unit 5 consists of maintaining a temperature level while partial decomposition of ammonium carbamate is being accomplished by the application of heat. Unit 5 may consist of a shell-and-tube heat exchanger; however, other suitable heat transfer apparatus may be used in this operation, such as for example, the type described in U.S. Patent No. 2,701,262. The process stream then passes to first stage decomposer separator 6, in which a gas-liquid separation takes place. Unit 6 preferably consists of a vertical cylindrical vessel, baffled on the inside, with inlet nozzle tangential to the shell. However, any suitable gas-liquid separation device may be employed as unit 6. The gas stream leaves via line 14 at a pressure of 20–75 p.s.i.a.

The liquid residual effluent then passes into second stage ammonium carbamate decomposer 7, which has a design, function, and effect similar to unit 5 described above. The purpose of unit 7 is to decompose all ammonium carbamate which may remain in the liquid stream entering from unit 6. The process stream then enters a vessel 8 in which final gas-liquid separation takes place. A pressure somewhat lower than in unit 6 is maintained in unit 8 by withdrawal of gases therefrom via line 13 to ejector 12 which serves to remove the gas phase from said unit 8. Temperature in units 7 and 8 is essentially the same as in units 5 and 6, however the pressure in unit 8 is lower than in unit 6, and is preferably maintained in a vacuum range, below 15 p.s.i.a. The final residual effluent stream leaves unit 8 as a liquid via line 9, said stream then passing to conventional urea recovery operations such as evaporation and prilling or crystallization.

Referring back to excess ammonia separator 3, the ammonia gas stream leaving unit 3 via line 10 splits, and a portion recycles to urea synthesis feed via 19. The balance passes to an ammonia ejector unit 12 via 20. A preheater unit 11 may be included in line 20 to furnish additional heat to the ammonia gas so as to prevent crystallization of ammonium carbonate subsequent to unit 12. The purpose of unit 12 is to utilize the pressure of the ammonia gas in line 20 to generate suction, said suction is applied to line 13 so as to maintain a reduced pressure in line 13 and unit 8, as described above.

The combined gas stream consisting of ammonia gas from line 10 and ammonia, carbon dioxide and water vapor from line 13, leaves unit 12 via line 15 at a pressure of 20-75 p.s.i.a. An additional gas stream 14 consisting of ammonia, carbon dioxide and water vapor from first stage decomposer separator 6 is combined with gas stream 15 to form a final total gas stream 16 which is passed to low-pressure ammonia gas utilization units such as an ammonium nitrate plant.

The balance of the excess ammonia gas stream 10 is recycled to the urea synthesis unit 1 via 19 after conventional processing such as cooling, liquefaction and compression.

This invention is not restricted to the process ranges detailed in the above example, process operating variables may be changed somewhat in practice without affecting the overall process results derived from the novel utilization of excess ammonia off-gas as described in this invention. A significant operating variable which could change the process ranges to some extent in specific installations is the gas pressure requirements of the particular low-pressure ammonia gas utilization unit.

Other modifications of the invention will be obvious to those skilled in the art. Thus, for example, the processing described herein could be readily applied to urea processes wherein single stage ammonium carbamate decomposition is provided.

The following is a specific example of an actual commercial embodiment of this invention.

*Example*

The effluent from a urea synthesis autoclave is passed through a pressure reducing valve and enters the excess ammonia separator unit at a pressure of 257 p.s.i.a. and temperature of 212° F. The effluent is maintained in the separator unit at a temperature of 250° F. and a major portion of uncombined ammonia in the effluent is removed as an overhead gas at 215-240 p.s.i.a. The residual effluent is then passed through a pressure reducing valve which provides a downstream pressure regulated between 20 and 40 p.s.i.a., and into the first stage ammonium carbamate decomposer which is maintained at a temperature of 250° F. A partial decomposition of ammonium carbamate into ammonia and carbon dioxide is produced, with essentially no decomposition of urea into biuret. The residual effluent together with said decomposition products is passed into a separator vessel from which ammonia, carbon dioxide and water vapor are removed as a gas stream at a pressure between 20 and 40 p.s.i.a.

The residual effluent is then passed into the second stage ammonium carbamate decomposer. This is also maintained at a temperature of 250° F., and the remainder of the ammonium carbamate present in the residual effluent stream is decomposed into ammonia and carbon dioxide with essentially no decomposition of urea into biuret. The residual effluent together with said decomposition products is then passed into a final separator or hold-up tank, which may also serve as a feed tank for subsequent urea product recovery operations. This last tank is maintained at a sub-atmospheric pressure, between 5 and 15 p.s.i.a., by means of an ejector device which utilizes a portion of the excess ammonia gas previously removed from the effluent stream at 215-240 p.s.i.a. Said ammonia gas is preheated and passes into the ejector at 190° F. and 215-235 p.s.i.a., and leaves the ejector at a pressure between 20 and 40 p.s.i.a. The expansion of said ammonia gas generates suction which maintains the low pressure level on the final separator tank and removes final portions of ammonia and carbon dioxide from said tank.

The final residual effluent stream is now suitable for urea product recovery operations, such as evaporation and crystallization or prilling, with a residual ammonia content of less than 0.2%. This may be compared to prior art practice in which a residual ammonia content of 1% or more was accepted, primarily because of the necessity of avoiding biuret formation which results from sustained evaporative heating. The gas stream leaving the ejector at a pressure between 20 and 40 p.s.i.a. is combined with the gas stream from the first stage ammonium carbamate decomposition separator vessel. The combined gas stream then passes to ammonia utilization operations such as ammonium nitrate manufacture, and is readily usable since the ammonia is available in concentrated form and the presence of excessive water with consequent dilution problems has been avoided.

The balance of the excess ammonia gas which was removed from the effluent stream at 215-240 p.s.i.a. in the excess ammonia separator but not utilized in the ejector, is recycled to the urea synthesis process.

We claim:

1. In a urea synthesis process comprising reacting ammonia and carbon dioxide at elevated pressure to form a process stream containing urea, ammonium carbamate, residual ammonia and water, reducing the pressure of said process stream, separating substantially pure gaseous ammonia from said process stream, further reducing the pressure of said process stream, heating said process stream thereby decomposing ammonium carbamate, and thereafter separating the resulting mixed ammonia-carbon dioxide gas stream from the residual process stream, said residual process stream consisting of product aqueous urea solution essentially free of residual ammonia and carbon dioxide, the improvement which comprises expanding said substantially pure gaseous ammonia to a lower pressure level, utilizing the expansion energy derived therefrom to produce an evacuating effect over said residual process stream to separate residual ammonia and carbon dioxide from said residual process stream at a sub-atmospheric pressure level, entraining said residual ammonia and carbon dioxide into the substantially pure gaseous ammonia and combining said gaseous ammonia and said mixed gas stream to form a final off-gas stream, and a product aqueous urea solution which contains a negligible biuret content.

2. Process of claim 1, in which said gaseous ammonia is heated prior to said expansion step.

3. In a urea synthesis process comprising reacting ammonia and carbon dioxide at elevated pressure to form a process stream containing urea, ammonium carbamate, residual ammonia and water, reducing the pressure of said process stream, separating substantially pure gaseous ammonia from said process stream, further reducing the pressure of the residual process stream, heating said residual process stream whereby a portion of said ammonium carbamate is decomposed, separating a first mixed ammonia-carbon dioxide gas stream from said residual process stream, further heating said residual process stream whereby the balance of said ammonium carbamate is decomposed, and separating a second mixed ammonia-carbon dioxide gas stream from the final residual process stream, said final residual process stream consisting of product aqueous urea solution essentially free of residual ammonia and carbon dioxide, the improvement which comprises expanding said substantially pure gaseous ammonia to a lower pressure level, utilizing the expansion energy derived therefrom to produce an evacuating effect on the final residual process stream, and entraining the second mixed ammonia and carbon dioxide contained in the final residual process stream into the substantially pure gaseous ammonia thereby effecting the separation of said second mixed gas stream from said final residual process stream at a sub-atmospheric pressure level and combining said gaseous ammonia and said second mixed ammonia-carbon dioxide gas stream to form a combined off-gas stream at a superatmospheric pressure, and produce an aqueous urea solution with a negligible biuret content.

4. Process of claim 3, in which said first mixed ammonia-carbon dioxide gas stream is added to said combined off-gas stream at superatmospheric pressure to form a final off-gas stream.

5. In a urea synthesis process comprising reacting ammonia and carbon dioxide at elevated pressure to form a process stream containing urea, ammonium carbamate, residual ammonia and water, reducing the pressure of said process stream to the range of 215 p.s.i.a. to 275 p.s.i.a., separating substantially pure gaseous ammonia at 215 p.s.i.a. to 265 p.s.i.a. from said process stream maintained at a temperature between 200° F. to 250° F., further reducing the pressure of the residual process stream to between 20 to 75 p.s.i.a., heating said residual process stream at a temperature in the range of 200° F. to 260° F. whereby a portion of said ammonium carbamate is decomposed, separating a first mixed ammonia-carbon dioxide gas stream from said residual process stream, further heating said residual process stream at a temperature in the range of 200° F. to 260° F. whereby the balance of said ammonium carbamate is decomposed, and separating a second mixed ammonia-carbon dioxide gas stream from the final residual process stream, said final residual process stream consisting of product aqueous urea solution, the improvement which comprises heating said substantially pure gaseous ammonia to a temperature of at least about 190° F., expanding said gaseous ammonia from an inlet pressure in the range of 215 p.s.i.a. to 265 p.s.i.a. to a lower outlet pressure in the range of 20 p.s.i.a. to 75 p.s.i.a., utilizing the expansion energy derived therefrom to produce an evacuating effect on the final residual process stream, and entraining the second mixed ammonia and carbon dioxide gas stream contained in the final residual process stream into the substantially pure gaseous ammonia, thereby effecting the separation of said second mixed gas stream from said final residual process stream at a sub-atmospheric pressure between 5 p.s.i.a. to 15 p.s.i.a. and combining said gaseous ammonia and said second mixed ammonia-carbon dioxide gas stream to form a combined off-gas stream at said outlet pressure in the range of 20 p.s.i.a. to 75 p.s.i.a., and whereby said product aqueous urea solution is obtained with negligible biuret content and less than 0.2% residual ammonia content.

References Cited in the file of this patent

UNITED STATES PATENTS

| | | |
|---|---|---|
| 2,267,133 | Porter | Dec. 23, 1941 |
| 2,632,771 | White | Mar. 24, 1953 |

FOREIGN PATENTS

| | | |
|---|---|---|
| 958,503 | France | Mar. 13, 1950 |
| 1,200,634 | France | June 29, 1959 |

OTHER REFERENCES

Fiat: Final Report No. 889, "Urea Manufacture," Field Information Agency, Technical, pages 13–14 (1946).

Frejacques: Chimie et Industrie, vol. 60, No. 1, pages 28–33 (1948).

Cook: Chemical Engineering Progress, vol. 50, No. 7, pages 327–331 (1954).

Town: Chemical Engineering, vol. 62, October 1955, pages 186–189 (1955).

Cronan: Chemical Engineering, vol. 66, pp. 48, 50 (Jan. 26, 1959).